United States Patent [19]

Torii et al.

[11] Patent Number: 4,877,973
[45] Date of Patent: Oct. 31, 1989

[54] APPARATUS FOR DEALING WITH CABLES IN INDUSTRIAL ROBOTS

[75] Inventors: Nobutoshi Torii, Hachioji; Hitoshi Mizuno; Kyoji Iwasaki, both of Hino, all of Japan

[73] Assignee: Fanuc Ltd., Minamitsuru, Japan

[21] Appl. No.: 117,195

[22] PCT Filed: May 30, 1987

[86] PCT No.: PCT/JP87/00349
§ 371 Date: Oct. 5, 1987
§ 102(e) Date: Oct. 5, 1987

[87] PCT Pub. No.: WO87/07450
PCT Pub. Date: Dec. 3, 1987

[30] Foreign Application Priority Data

May 30, 1986 [JP] Japan .................... 61-124788

[51] Int. Cl.⁴ ............ H01B 7/30; H02G 11/00; B25J 19/00
[52] U.S. Cl. .................... 307/147; 439/445; 378/194; 378/198; 248/49; 248/68.1

[58] Field of Search ............ 307/147; 439/445, 501; 248/68.1, 49; 378/194, 198

[56] References Cited

FOREIGN PATENT DOCUMENTS 59-134690  8/1984  Japan .

Primary Examiner—William M. Shoop, Jr.
Assistant Examiner—Sharon D. Logan
Attorney, Agent, or Firm—Staas & Halsey

[57] ABSTRACT

An apparatus for guiding a cable of an industrial robot having a support casing and a swivel casing axially supported by a swivel shaft bearing includes a cable guide. The guide has an end of an upper arm axially supported on a swivel axis inside the swivel casing, and an end of a lower arm axially supported on the swivel axis inside the support casing. A back column formed between the upper and lower arms guide passes through first and second arcuate cut-out portions provided in the swivel casing and support casing. A cable is passed from the support casing into the swivel casing along the cable guide back column, and moves proportionately to angular movement of the swivel casing.

9 Claims, 3 Drawing Sheets

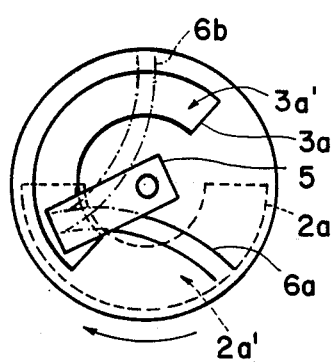 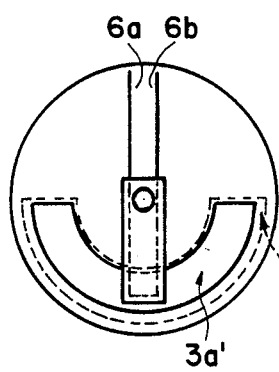 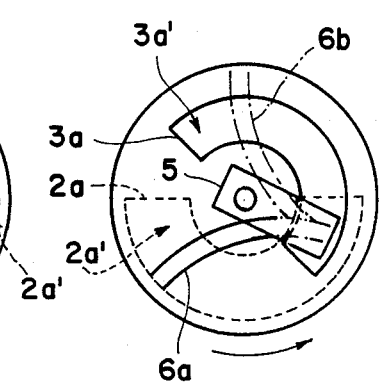
FIG. 2A  FIG. 2B  FIG. 2C
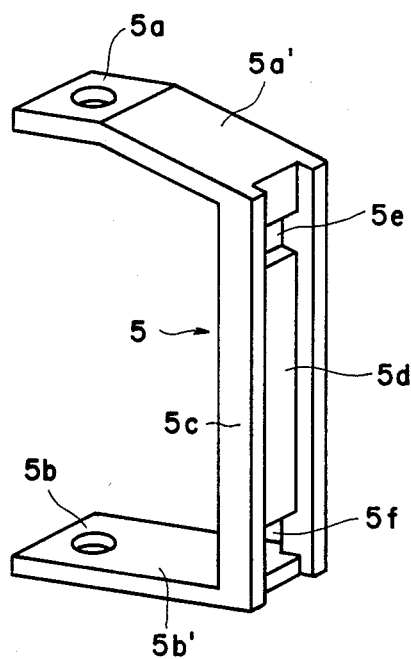
FIG. 3

APPARATUS FOR DEALING WITH CABLES IN INDUSTRIAL ROBOTS

BACKGROUND OF THE INVENTION

Cross-Reference to Related Application

The subject matter of the present application is related that of U.S. application Ser. No. 093,021, filed Aug. 5, 1987.

TECHNICAL FIELD

This invention relates to an apparatus for guiding a cable in an industrial robot and, more particularly, to an apparatus for guiding a cable provided between a support casing and swivel casing of an industrial robot having a swivel shaft.

BACKGROUND ART

An industrial robot is usually provided on a base secured to a floor or capable of moving along a floor. FIG. 4 is a side view illustrating one example of an industrial robot provided on a base secured to a floor.

In the Figure, numeral 1 denotes a base secured to the floor of a factory or the like. The base 1 has an upper portion on which there is provided a support casing 2 forming a fixed portion of a swivel shaft. The upper portion of the support casing 2 is provided with a rotatable swivel casing 3 forming the movable portion of the swivel shaft.

Attached to the upper part of the swivel casing 3 is a support portion 5 of a first arm 4 which operates over an oscillating angle W. Swingably attached to the upper part of the first arm 4 is a second arm 6 having a wrist 7.

In an industrial robot of this type, cables for leading power and signals to the first arm 4 are usually introduced into the first arm 4 via the swivel casing 3. The cables passing through the interior of the swivel casing 3 are twisted and pulled in accordance with the turning motion of the swivel casing 3 and move while the outer surfaces thereof rub against one another and contact the cramped interior of the swivel casing 3.

Since the outer surfaces of the cables move while contacting the interior of the swivel casing 3 due to the turning motion of the swivel casing 3, as described above, these outer surfaces are damaged. If the damage progresses, not only will the cable cores be severed to cause industrial robot malfunction but the power lines may also be grounded to the swivel casing to cause unforeseen accidents.

By way of example, an invention described in Japanese patent application No. 61-053224 has been proposed by the present inventors to solve the above problem. According to the aforementioned invention, a swivel shaft bearing at the joint between the swivel casing and support casing is provided with a hollow portion and a cable is passed through this portion. However, a support casing, swivel casing and swivel shaft bearing having a high mechanical strength are required because of the turning motion of the swivel shaft. In particular, in a case where a number of cable wires are accommodated in the hollow portion, it is difficult to realize a structure which will not diminish the rigidity of the hollow portion.

SUMMARY OF THE INVENTION

The present invention has been devised in view of the foregoing problems and its object is to provide an apparatus for dealing with the cable of an industrial robot in which the outer surface of the cable passing between two casings axially supported for free rotation relative to each other will not be damaged and the cable itself will not be subjected to excessive forces.

In accordance with the present invention, there is provided an apparatus for guiding a cable of an industrial robot having a support casing and a swivel casing freely turnably supported by the support casing for undergoing swiveling motion, and equipped with a cable led into the interior of the swivel casing from the support casing, the apparatus comprising an upper wall provided on an upper portion of the support casing, which is hollow, a first arcuate cut-out portion provided in the upper wall, a lower wall provided on a lower portion of the swivel casing, which is hollow, adjacent the upper wall provided on the upper portion of the support casing, a second arcuate cut-out portion provided in the lower wall and at least partially overlapping the first arcuate cut-out portion provided in the upper wall of the support casing, a generally "]"-shaped cable guide having an upper arm, a lower arm and a back column portion joining ends of the upper and lower arms, the back column portion passing through the first and second arcuate cut-out portions and being supported for free turning motion inside the two casings by free distal ends of the upper and lower arms, and a cable provided along the back column portion of the cable guide and connecting the support casing and swivel casing.

BRIEF DESCRIPTION OF THE DRAWINGS

FIGS. 2A-2C are top views illustrating the guiding of a cable according to the present embodiment, FIG. 3 is a perspective view illustrating a cable guide.

DETAILED DESCRIPTION OF THE PREFERRED EMBODIMENTS

A preferred embodiment of the present invention will now be described in detail with reference to the drawings.

Figure 1:
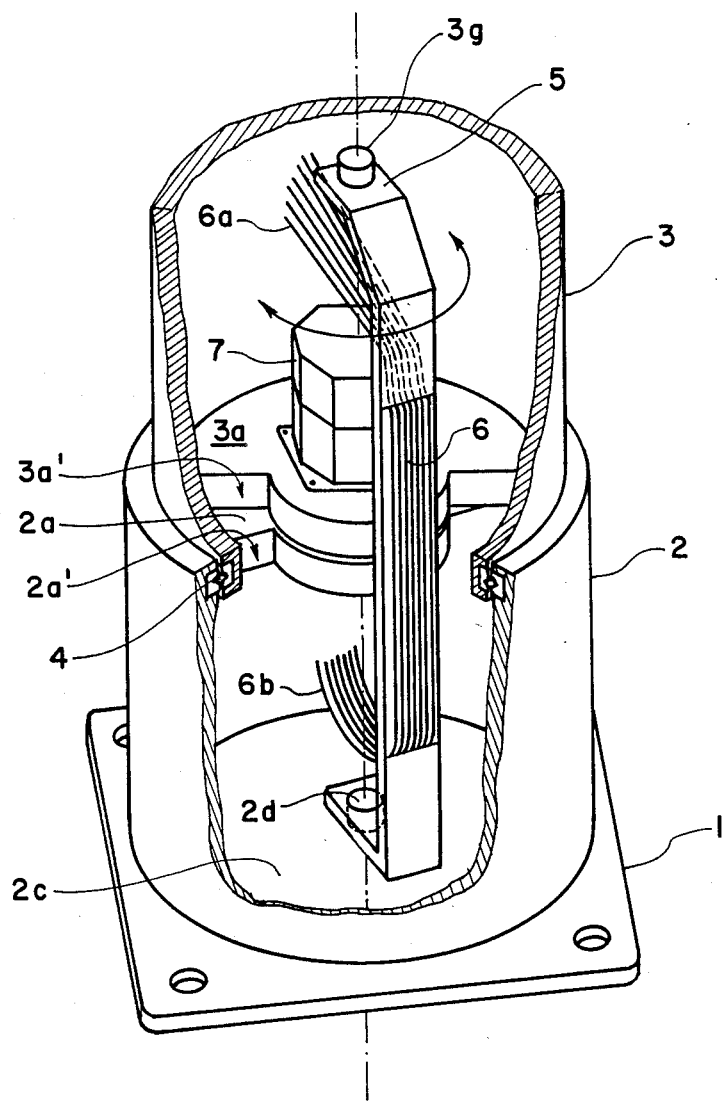
FIG. 1 is a perspective view illustrating an embodiment of an apparatus for guiding a cable of an industrial robot in accordance with the present invention.
Figure 4:
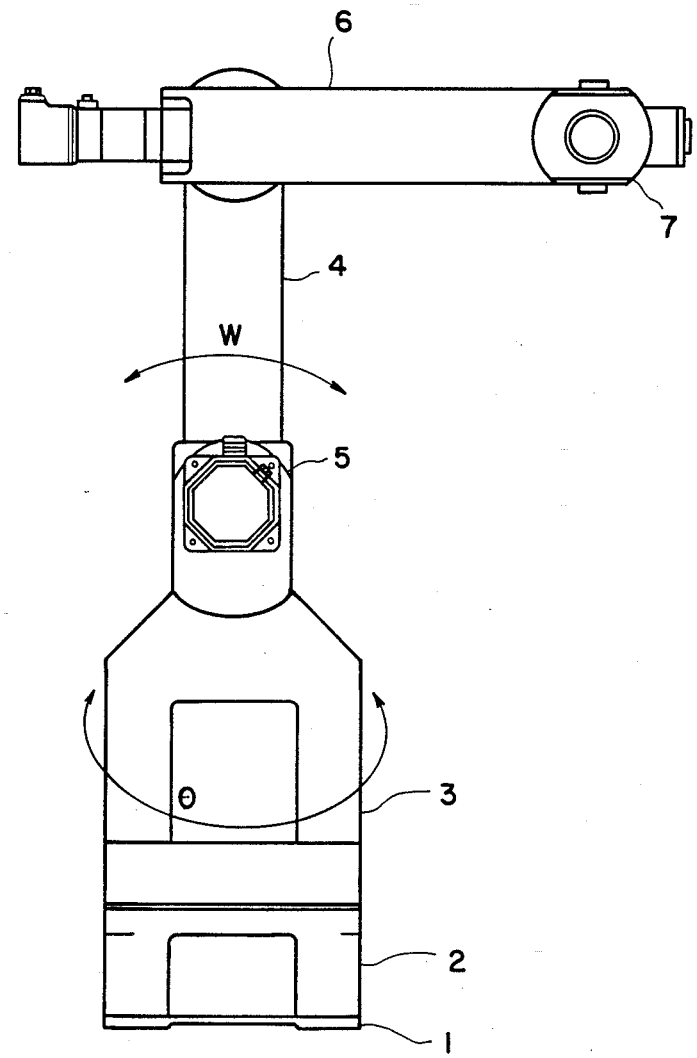
FIG. 4 is a side view illustrating an example of an industrial robot.

FIG. 1 is a perspective view illustrating an embodiment of an apparatus for guiding the cable of an industrial robot in accordance with the present invention. Portions identical to those shown in FIG. 4 are designated by like reference numerals.

In FIG. 1, numeral 1 denotes a base secured to the floor of a factory or the like for having a robot installed thereon. The base 1 has an upper portion on which there is provided a hollow, cylindrical support casing 2 forming a fixed portion of a swivel shaft. The upper portion of the support casing 2 is provided with a hollow, cylindrical swivel casing 3 forming the movable portion of the swivel shaft capable of turning through a predetermined range of rotation. An upper wall 2a of the hollow, cylindrical support casing 2 has a cut-out portion 2a'. The cut-out portion 2a' is formed into an arcuate shape of a predetermined radial angle. Preferably, the cut-out portion 2a' should have a spread or radial angle of 180° as seen from the central axis of rotation common to both the support casing 2 and swivel casing 3.

A cut-out portion 3a' is also formed in a lower wall 3a of the swivel casing 3 facing the upper wall 2a of the support casing 2. The cut-out portion 3a' is formed into an arcuate shape substantially identical with that of the cut-out portion 2a' and preferably has a spread or radial angle of 180° as seen from the central axis of rotation common to both the support casing 2 and swivel casing 3.

Numeral 4 denotes a swivel shaft bearing which axially supports the swivel casing 3 and support casing 2 so that the swivel casing 3 is free to rotate relative to the stationary support casing 2.

FIG. 3 is a perspective view of a cable guide 5. As seen from the side, the cable guide 5 has an external shape in the form of the bracket character "]". The cable guide 5 is formed by working plate metal or by molding a synthetic resin. Shaft holes 5a, 5b are formed respectively near the distal end portion of an upper arm 5a' of the cable guide 5 and near the distal end portion of a lower arm 5b' of the cable guide 5. The proximal ends of the upper arm 5a' and the lower arm 5b' are integrally formed with a back column 5c. The back column 5c has a substantially U-shaped cross section and is provided in its outer side with a cable-guiding groove 5d. Cable insertion holes 5e and 5f, through which cables are passed from the inner side of the back column 5c to the outer side cable-guiding groove 5d, are formed near the upper and lower portions of the cable-guiding groove 5d, respectively. A cable provided between the support casing 2 and swivel casing 3 is inserted through the cable insertion holes 5e and 5f.

In FIG. 1, a pin 3g provided on the upper surface of the swivel casing 3 at the center thereof is loosely fitted into the shaft hole 5a of cable guide 5, and a pin 2d provided on the lower surface 2c of the support casing 2 at the center thereof is loosely fitted into the shaft hole 5b. The back column 5c of the cable guide 5 is passed through a space formed by overlapping the cut-out portion 3a' formed in the lower wall 3a of swivel casing 3 and the cut-out portion 2a' formed in the upper wall 2a of support casing 2.

With such an arrangement, the cable guide 5 will be capable of swinging about an axis passing through the centers of the upper and lower shaft holes 5a and 5b, namely the swivel axis, when the support casing 2 and swivel casing 3 rotate relative to the stationary support casing.

Numeral 6 denotes a cable through which power and signals are sent from the side of the support casing 2 to the side of the swivel casing 3. The cable 6 is introduced from near the upper portion of shaft hole 5b at the lower part of the cable guide 5 into the cable-laying groove 5d through the cable insertion hole 5f and is passed through the cable insertion hole 5e at the upper part of the cable guide before being led over the upper surface of the lower wall 3a of swivel casing 3. Numeral 7 denotes a drive motor mounted on the lower wall 3a for turning the swivel casing 3.

The operation of the present embodiment thus constructed will now be described.

FIGS. 2A-2C are top views illustrating the guiding of the cable in the present embodiment during swiveling motion of the swivel casing 3. An upper end 6a of the cable (indicated by the solid lines) inside the swivel casing 3 and a lower end 6b of the cable (indicated by the one-dot chain lines) inside the support casing 2 are shown schematically as seen from above.

FIG. 2B shows the arcuate cut-out portions in the lower wall 3a of swivel casing 3 and upper wall 2a of support casing 2 in a state where the cut-out portions are vertically aligned with each other. In this state the upper end cable 6a and lower end cable 6b are not twisted and are situated in a plane which includes the cable guide 5. Next, if the swivel casing 3 is rotated clockwise through a predetermined angle starting from the state shown in FIG. 2B until it is situated as shown in FIG. 2A, the cable guide 5 will also rotate in the clockwise direction through an angle which is about one-half the abovementioned angle of rotation, so that the upper end 6a of the cable 6 led into the swivel casing 3 from the upper cable guiding hole 5e will curve into an arc having a large radius. The lower end 6b of cable 6 from the lower cable-guiding hole 5f will also curve into an arc having a large radius.

If the swivel body 3 is rotated counter-clockwise starting from the state shown in FIG. 2B until the state shown in FIG. 2C is attained, the cable guide 5 will also rotate in the counter-clockwise direction through one-half this angle, so that the upper end 6a and lower end 6b of cable 6 will both curve into arcs having large radii.

Thus, the cable guide rotates through an angle which is about one-half the angle of rotation (the swivel angle) of the swivel casing relative to the support casing 2. As a result, the external force acting upon the cable is split evenly between the upper end 6a and lower end 6b, and these cable ends are bent into the arcs having large radii. This means that excessive stresses will not be produced within the cable.

Though the present invention has been described in accordance with an embodiment as set forth above, the invention can be modified in various ways without departing from the scope of the claims.

In the present invention, the arrangement is such that the distal end portion of the upper arm of a cable guide formed into a generally "]"-shaped configuration is axially supported on a swivel casing, the distal end portion of the lower arm of the cable guide is axially supported on a support casing, spaces comprising cut-out arcuate portions are formed at the portion where the support casing and swivel casing contact each other, and the cable guide is capable of moving freely within this space. As a result, the cable guide will swing through the space in response to stress acting upon the cable, so that the stress will be diffused over a wide area of the cable itself without being received at a specific narrow portion thereof. Excessive bending stress therefore will not act upon the cable, as a result of which the life of the cable is prolonged. Furthermore, since the part of the cable that undergoes a large amount of movement is held by the cable guide, the surface of the cable will not come into direct sliding contact with the inner surfaces of the two casings, thus preventing cable damage.

The inventive apparatus for guiding the cable of an industrial robot can not only be used in a polar coordinate-type robot but can also be applied to other robot configurations such as cylindrical coordinate-type and articulated-type robots. It goes without saying that the apparatus of the invention can also be applied to portions where two support columns or the like are axially supported for free rotation, as in construction machinery.

We claim:

1. An apparatus for guiding a cable of an industrial robot having a hollow support casing and a hollow swivel casing rotatably supported by said support casing for undergoing swiveling motion, and equipped with a cable led into the interior of the swivel casing from the support casing, the apparatus comprising:
   an upper wall provided on an upper portion of the support casing;
   a first arcuate cut-out portion provided in said upper wall;
   a lower wall provided on a lower portion of the swivel casing adjacent the upper wall provided on the upper portion of said support casing;
   a second arcuate cut-out portion provided in said lower wall and at least partially overlapping the first arcuate portion provided in the upper wall of the support casing;
   a cable guide having an upper arm, a lower arm, each having proximal and distal ends, and a back column portion joining the proximal ends of the upper and lower arms, the back column portion passing through said first and second arcuate portions and being rotatably supported inside said support casing and swivel casing at the distal ends of the upper and lower arms; and
   a cable provided along the back column portion of the cable guide and being connected at one end to the support casing and at the opposite end to the swivel casing.

2. An apparatus for guiding a cable of an industrial robot according to claim 1, wherein said cable is held by the cable guide upon being passed through two cable insertion holes provided in the back column of the cable guide.

3. An apparatus for guiding a cable of an industrial robot according to claim 1, wherein the upper arm and lower arm of the cable guide are both rotatable about a central axis of rotation common to the support casing and swivel casing.

4. An apparatus for guiding a cable of an industrial robot according to claim 1, wherein the swivel casing is rotatably supported by a bearing at an upper edge portion of the support casing and a lower edge portion of the swivel casing.

5. An apparatus for guding a cable of an industrial robot according to claim 1, wherein the first arcuate portion and the second arcuate cut-out portion are substantially similar in shape and have a 180° spread when viewed from a central axis of rotation common to the support casing and swivel casing.

6. An apparatus for guiding a cable of an industrial robot according to claim 1, further comprising a drive mechanism disposed between the upper arm and lower arm of the cable guide for turning the swivel casing relative to the support casing.

7. An apparatus for guiding a cable of an industrial robot according to claim 5, wherein the cable guide is rotatable in response to rotation of the swivel casing relative to the support casing.

8. An apparatus for guiding a cable of an industrial robot according to claim 7, wherein the cable guide is rotatable through an angle about one-half the angle of the rotation of the swivel guide.

9. An apparatus for guiding a cable of an industrial robot according to claim 1, wherein the cable has upper and lower ends and wherein the upper and lower ends are coplanar with the cable guide when the first and second arcuate cut-out portions are vertically aligned.

* * * * *

UNITED STATES PATENT AND TRADEMARK OFFICE
CERTIFICATE OF CORRECTION

PATENT NO. : 4,877,973

DATED : Oct. 31, 1989

INVENTOR(S) : Torii et al.

It is certified that error appears in the above-identified patent and that said Letters Patent is hereby corrected as shown below:

In the Title, change "Dealing with" to --Guiding--.

In the Abstract, line 3, after "bearing" insert --,--;
line 8, delete "guide".

Col. 1, line 31, change "5" to --5'-- and change "4" to --4'--;
line 33, change "4" to --4'-- and change "6" to --6'--;
line 34, change "7" to --7'--;
line 36, change "4" to --4'--;
line 37, change "4" to --4'--.
line 35, change "7" to --7'--;

Col. 2, line 39, after "guide" insert --of a preferred embodiment of the invention--.

Col. 4, line 43, after "comprising" insert --arcuate--;
line 44, delete "arcuate".

Col. 6, line 11, change "guding" to --guiding--;
line 29, delete "the" (first occurrence).

Signed and Sealed this

Twelfth Day of February, 1991

Attest:

HARRY F. MANBECK, JR.

*Attesting Officer*      *Commissioner of Patents and Trademarks*